United States Patent [19]

Van der Lely et al.

[11] Patent Number: 4,805,559
[45] Date of Patent: Feb. 21, 1989

[54] IMPLEMENT FOR MILKING ANIMALS

[75] Inventors: Ary Van der Lely, Maasland; Karel Van den Berg, Bleskensgraaf, both of Netherlands

[73] Assignee: C. van der Lely N.V., Maasland, Netherlands

[21] Appl. No.: 90,035

[22] Filed: Aug. 27, 1987

[30] Foreign Application Priority Data

Aug. 27, 1986 [NL] Netherlands .................. 8602172

[51] Int. Cl.⁴ .............................................. A01J 7/00
[52] U.S. Cl. .................................................. 119/14.1
[58] Field of Search ................. 119/14.03, 14.08, 14.1, 119/14.11

[56] References Cited

U.S. PATENT DOCUMENTS

| | | | |
|---|---|---|---|
| 3,402,699 | 9/1968 | Cain | 119/14.04 |
| 3,973,520 | 8/1976 | Flocchini | 119/14.08 |
| 4,010,714 | 3/1977 | Notsuki et al. | 119/14.03 |
| 4,223,635 | 9/1980 | Akerman | 119/14.03 |
| 4,479,206 | 10/1984 | Granberg et al. | 367/104 |

FOREIGN PATENT DOCUMENTS

| | | |
|---|---|---|
| 963130 | 2/1975 | Canada ............................ 119/14.08 |
| 91892 | 10/1983 | European Pat. Off. . |
| 191517 | 8/1986 | European Pat. Off. . |
| 2408300 | 6/1979 | France . |
| 138077 | 11/1974 | Japan . |
| 84/01833 | 5/1984 | World Int. Prop. O. . |
| 85/02973 | 7/1985 | PCT Int'l Appl. . |
| 776505 | 6/1957 | United Kingdom ............. 119/14.03 |

Primary Examiner—Robert P. Swiatek
Attorney, Agent, or Firm—Penrose Lucas Albright; Robert A. Miller

[57] ABSTRACT

An implement for milking an animal, such as a cow, that provides for sensor guided, automated attachment of teat cups to the teats of the animal's udder. Following attachment to the udder the teat cups are released from the attachment member and remain connected only by a flexible connection to the carrier during the milking operation, the flexible member permitting limited movement by the animal. Upon completion of the milking operation, tension is applied to the flexible connection and the teat cup is reseated on the attachment member.

29 Claims, 4 Drawing Sheets

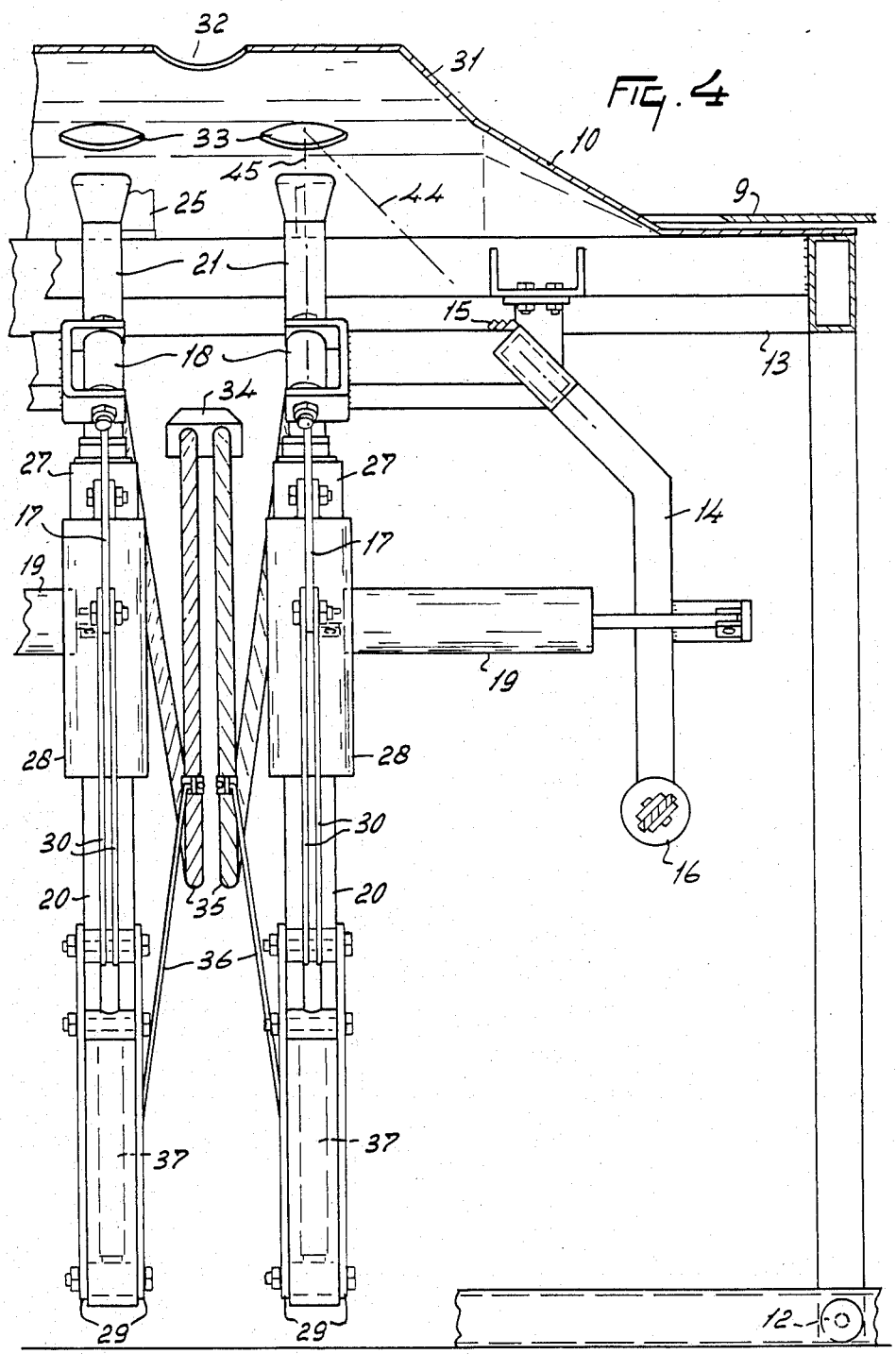

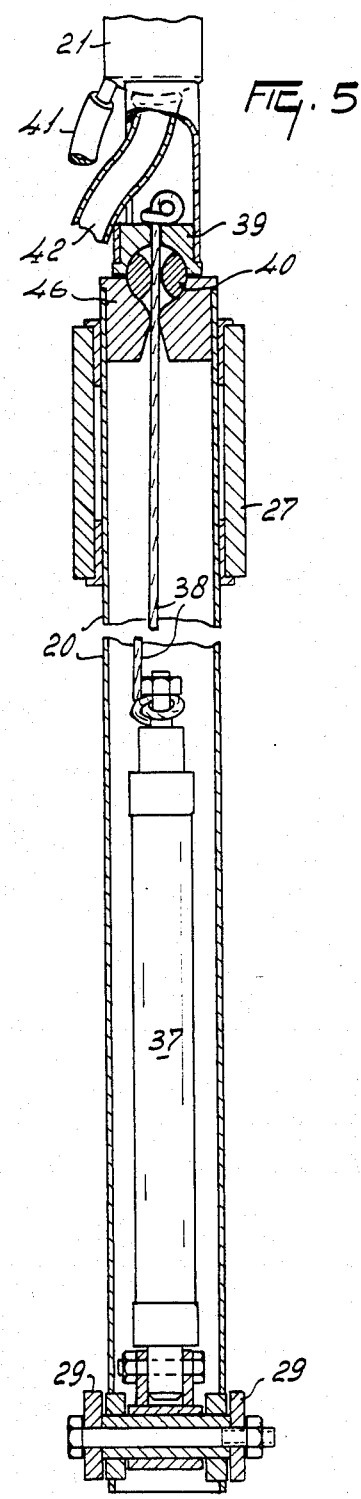
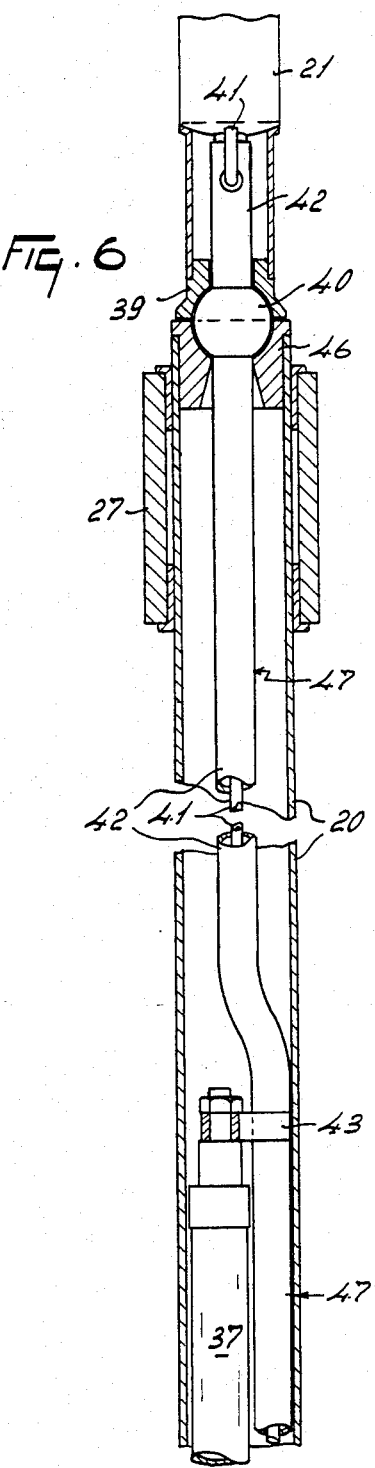

IMPLEMENT FOR MILKING ANIMALS

BACKGROUND OF THE INVENTION

The invention relates to an implement for milking animals, wherein a teat cup is attached to a teat of the animal's udder by means of an attachment member carrying the teat cup and reaching to near the udder in attaching the teat cup. With such an implement it is important for the teat cup, after having been attached to the teat of the udder, to have freedom of movement to follow the animal's movements, and allow for the change in the position of the teat as a result of the milking operation. The invention contemplates an implement for milking animals, wherein an attached teat cup can follow the animal's movements in an effective manner.

SUMMARY OF THE INVENTION

According to the invention, for this purpose the teat cup is connected to the attachment member by a flexible connection member, which connection member is capable of pulling the teat cup in a predetermined position against the attachment member and which connection member, in another phase, constitutes a flexible connection between the attachment member and the teat cup spaced therefrom. After the teat cup has been attached, the connection member then constitutes a flexible connection between the teat cup and the attachment member, so that no mechanical forces can be passed on.

In accordance with a further feature of the invention, the connection member is connected at its one end near the lower end of the teat cup and its other end extends through an aperture in the attachment member. According to the invention, there are provided drive means for pulling the connection member, so that the teat cup, which initially is spaced apart from the attachment member, is pulled towards same. The drive means may be provided by a pneumatic cylinder, use being made of the vacuum source employed for the suction of the milk. In accordance with a still further feature of the invention, the drive means are located within the attachment member. The attachment member is provided with a tubular member, near one end of which a teat cup is connected by means of the flexible connection member. According to the invention, the connection member is then arranged through at least part of the tubular member.

In accordance with a still further feature of the invention, the drive means for pulling the connection member is arranged at least partly in the tubular member.

In another feature of the invention, the contiguous parts of the teat cup on the one hand and the attachment member on the other hand are formed complementary in such a manner that the teat cup is brought to a specific position when the connection member is pulled, so that the said contiguous parts are set together. According to the invention, when the connection member is pulled, the teat cup is substantially in alignment with and at the end of an oblong portion of the attachment member. The oblong portion of the attachment member is then directed substantially upwardly, while the teat cup attached in alignment therewith also assumes a substantially vertical position, a position required for attachment of the teat cup to the teat.

Furthermore, according to the invention, there is arranged about the connection member, between the teat cup and the attachment member, a bead-shaped element which, when the connection member is pulled, is accommodated in a recess of corresponding shape in the teat cup and the attachment member. The connection member is then formed by a cord, e.g. of metal wire and/or synthetic material.

Also, according to the invention, the connection member may be formed by the milk tube and/or the pulsation tube. The milk tube and/or the pulsation tube is/are then arranged through the tubular member of the attachment member.

In accordance with a still further feature of the invention, the attachment member is provided with an elongate, axially slidable portion which, from a position below a milking parlor floor, is moved substantially axially towards a position wherein said slidable portion extends through an aperture in the floor to above said floor and near an animal's udder, the teat cup being connected to an end of said slidable portion via the connection member. The slidable portion may be of a tubular configuration. In accordance with a still further feature of the invention, the attachment member is supported in a manner so as to be capable of pivotal movement about at least two axes, which axes include an angle with the horizontal plane and which axes substantially intersect in the central portion of the aperture in the milking parlor floor, through which aperture the attachment member may extend. The attachment member is then supported by a first and a second frame portion, said first frame portion being pivotal about a first pivot axis and the second frame portion, to which the attachment member is connected, being connected pivotally about a second pivot axis to the first frame portion. In this connection, there may be provided means for bringing the attachment member in a predetermined position by pivoting about the pivot axes, which means may include stepper motors.

Furthermore, according to the invention, the slidable portion is slidable axially through a guide portion, and the slidable portion is seized near the other end by a drive member effecting the axial movement. The drive member is provided with a screw spindle unit, the length of which can be controlled by means of an electrical signal, e.g. by means of a potentiometer measuring the length of the screw spindle unit.

Furthermore, in accordance with a still further feature of the invention, the displacement of the slidable portion by means of the lever action of a rod system may be greater than the change in length of the screw spindle unit.

According to the invention, the teat cup is attached to a teat of an animal's udder by pivoting the attachment to a predetermined position and sliding the axially slidable portion over a predetermined distance, so that the teat cup, arranged on the end of the slidable portion of the attachment member slides over the teat of the animal's udder. After the teat cup has been connected to the teat by means of a vacuum applied therein, the attachment member is retracted somewhat, whereafter the connection between the teat cup and the attachment member is provided by the flexible connection member.

According to the invention, there may be provided one or more apertures in the milking parlour floor, through each of which apertures may extend an attachment member, said apertures being arranged in a raised portion relative to the floor, whereby the animal stands with her hindlegs on both sides of the raised portion.

In accordance with a still further feature of the invention, a teat cup can be placed in a reversed position by having its opening directed down by relaxing the connection member. This may be of importance when the implement is in the non-operative condition in order to avoid contamination of the teat cup or to drain superfluous liquid from the teat cup after the cleaning thereof. Furthermore, according to the invention, the milk tube and the pulsation tube may be designed at least partly coaxially.

For a better understanding of the invention and to show how the same may be carried into effect, reference will now be made, by way of example, to the embodiments shown in the drawings.

BRIEF DESCRIPTION OF THE DRAWINGS

FIG. 4 is a partial view, taken on the line IV—IV in FIG. 2;

FIG. 5 is a partial view of an attachment member, and

FIG. 6 is a view of a second embodiment of an attachment member.

DESCRIPTION OF PREFERRED EMBODIMENTS

Figure 1:
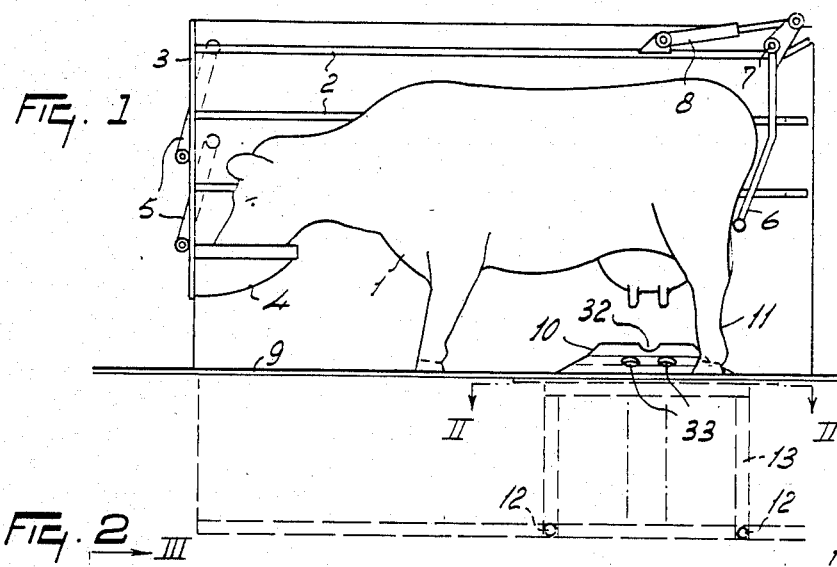
FIG. 1 shows an animal located in the milking parlor.

In the various drawings, corresponding parts are indicated by the same reference numerals.

The animal shown in FIG. 1 is located in a milking parlor. Said milking parlor is a space confined by guide rods 2, as a result of which the animal 1 enjoys only limited freedom of movement in the lateral direction. At its front side, the milking parlor is provided with a hingeable boundary 3, to which is attached a manger 4 and which by means of pivot arms 5 can be moved to above the level of the animal 1. The animal 1 can leave the milking parlor in the forward direction. Near the rear side of the animal 1, there is arranged a positioning arm 6 which can pivot about pivot shaft 7 and can be driven by operating cylinder 8, e.g. a pneumatic cylinder, using the vacuum system present for the milking operation.

When the positioning arm 6 is pivoted upward, the animal can enter the milking parlor by moving forward, the animal proceeding until its head reaches near the manger 4. To ensure that the animal proceeds to a sufficient extent and, in addition, to limit the animal's freedom of movement in the longitudinal direction, the pivot arm 6 can subsequently be pivoted downward to near the rear of the animal.

Below the floor 9 of the milking parlor is situated the milking implement portion which attends to the automatic attachment of the teat cups. In FIG. 1 this has been indicated in a limited manner. A raised portion 10 lies below the animal's udder and extends above the floor 9. The hindlegs 11 of the animal 1 are located on both sides of the raised portion 10, which reaches through a longitudinally elongate aperture in the milking parlor floor 9. The milking implement portion arranged below the floor 9 is capable of a slight movement by means of guide wheels 12, so that the raised portion 10, at least in the longitudinal direction with respect to the animal, can be moved to such an extent that it is positioned approximately below the udder.

Figure 2:
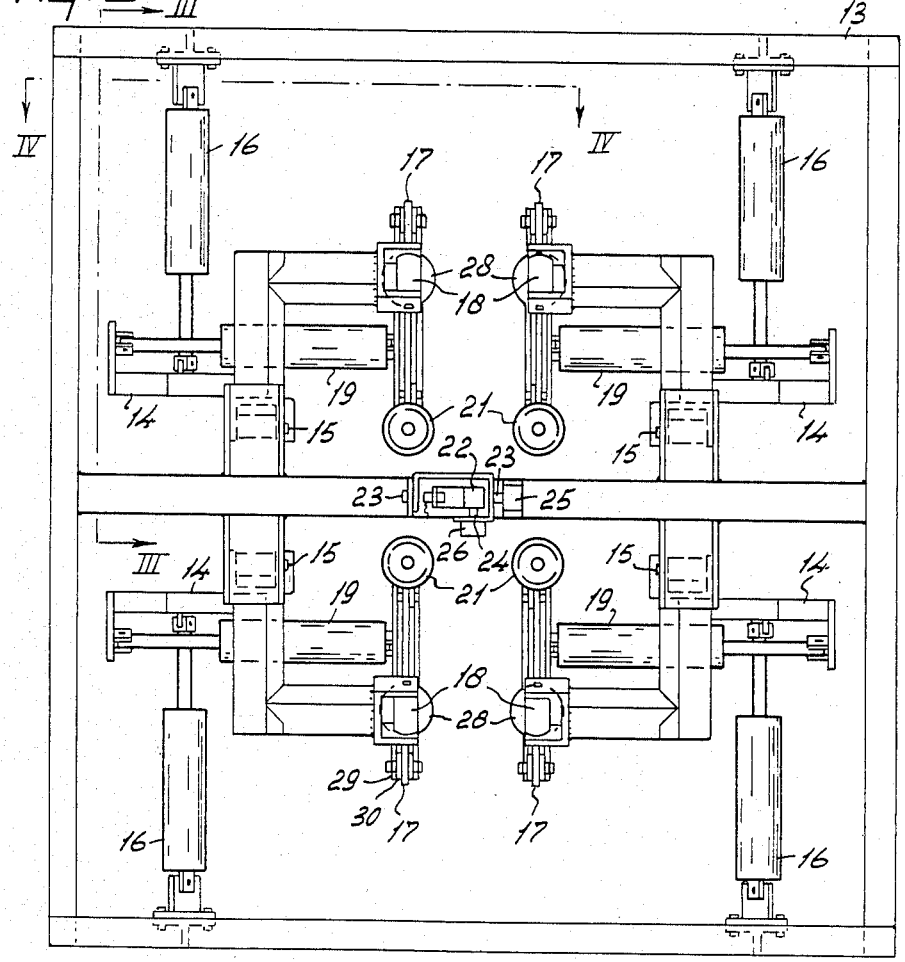
FIG. 2 is a plan view of part of the milking implement, taken on the line II—II in FIG. 1.

FIG. 2 shows, in a plan view, the apparatus for the automatic attachment of the teat cups as is situated below the floor 9 in FIG. 1. The apparatus is mounted in a frame 13 which is capable of movement in the longitudinal direction of the milking parlor and animal. In the frame 13 there is arranged a first frame portion 14 which by means of pivot 15 is suspended pivotally in said frame 13. Pivot 15 is suspended at an angle to the plane of the drawing in FIG. 2. The pivotal movement of the first frame portion 14 about pivot 15 is effected by means of a drive member 16 which at one end is attached to the frame 13 and at the other end is connected to the first frame portion 14. The apparatus furthermore comprises a second frame portion 17 which by means of pivot 18 is connected to the first frame portion 14. The pivotal movement of the second frame portion relative to the first frame portion is effected by a drive member 19 which at one end is connected to the second frame portion 17 and at the other end to the first frame portion 14. The second frame portion 17 comprises an axially movable attachment member 20 (FIG. 3) carrying at its top end a teat cup 21.

As is apparent from FIG. 2, the implement according to the embodiment comprises four attachment members, each of which is supported by a second frame portion 17 and a first frame portion 14. By energizing the drive means 16 and 19, each of the attachment members 20 can be placed in a desired position.

In FIG. 2 a sensor 22 is also shown. The sensor, by means of a sonic signal, is capable of measuring the distance to an object. The sensor 22 is pivotal about two axes 23 and 24 which are perpendicular relative to each other, said pivotal movement being effected by means of the electric motors 25 and 26. The provision of the pivotal movement permits the sensor 22 to determine the distance to the animal's udder in various directions, so that the position of the udder's teats can be established. In addition, the end of a teat is recognized by the sensor 22 because an object is perceived, the distance from which to the sensor is less than that of parts of the udder that are situated near the teat end.

Figure 3:
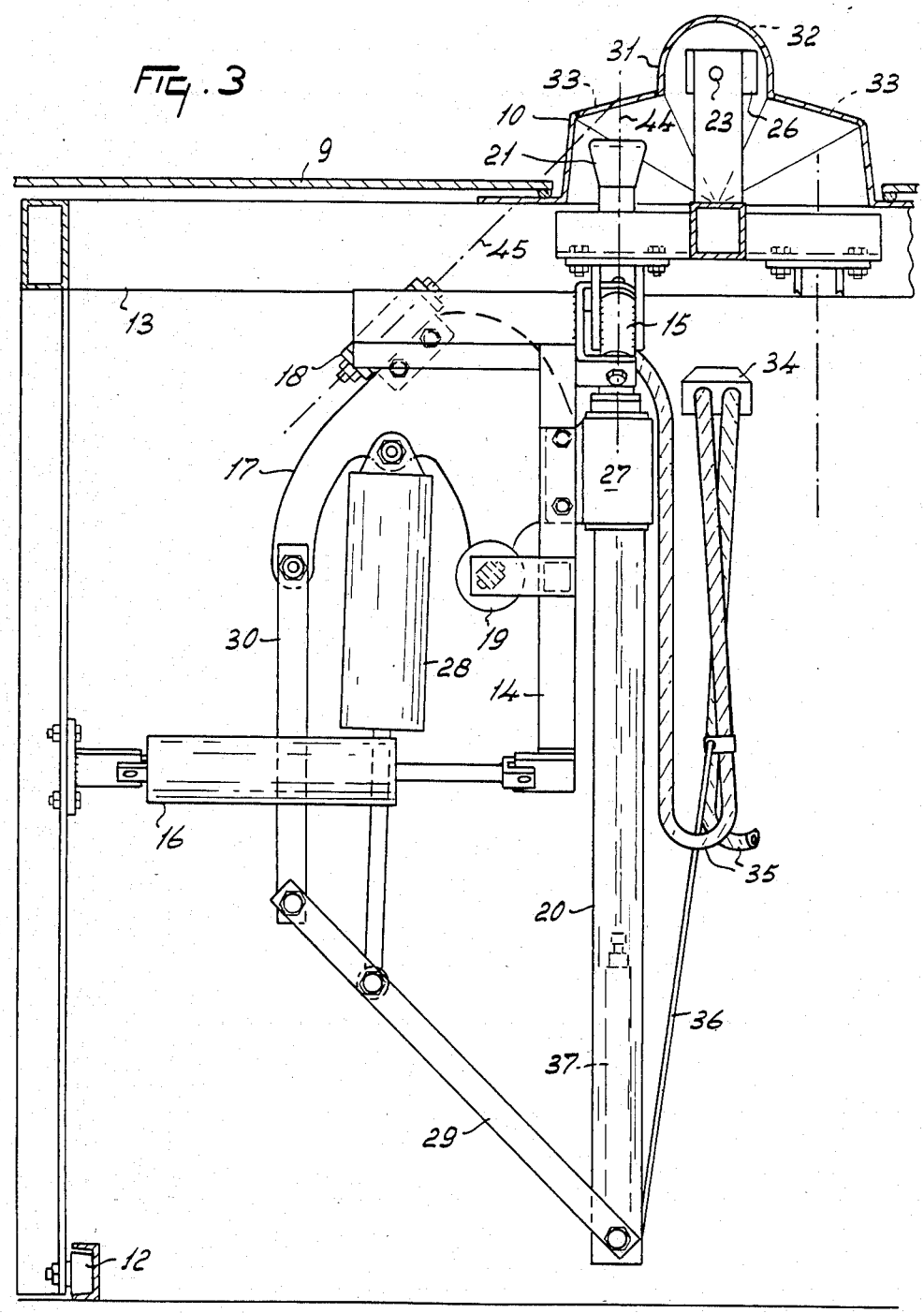
FIG. 3 is a partial view, taken on the line III—III in FIG. 2.

FIGS. 3 and 4 show the apparatus for the attachment of the teat cups in further detail. The axially slidable attachment member 20 is slidable through guide portion 27, which guide portion 27 is mounted on the second frame portion 17. The axial movement of the attachment member 20 through the guide portion 27 is effected by means of drive member 28 which at one end is connected to the second frame portion 17 and at the other, lower, end to a lever 29. The lever 29 is connected at one end to the end of the attachment member 20 and at the other end to the end of a connection rod 30 connected to the second frame portion 17. When the drive member 28 is energized, the axial position of the attachment member 20 can be set, namely in such a manner that upon a lengthening or shortening of drive member 28 a much greater axial displacement of the attachment member 20 is effected as a result of the lever action of lever 29. The drive member 28 is, for example, of the type provided with a spindle, an electric motor and a potentiometer, by means of which the change in length can be set accurately. Since it may be of importance for the teat cup to be attached as quickly as possible after detection of the teat, the rate at which drive member 28 acts is increased by means of lever 29. In FIGS. 3 and 4, the attachment member 20 is shown in the lowermost position, while the teat cup 21, located at the top end of the attachment member 20 is situated below a covering hood 31. The covering hood 31 constitutes the raised portion 10 of the floor 9 in FIG. 1. Consequently, the covering hood 31 reaches upwardly through an elongate aperture in the milking parlor floor to between the hindlegs 11 of the animal 1.

In the covering hood 31 there are provided a plurality of apertures 32, 33. Aperture 32 is situated above the sensor 22, so that the lower side of the animal, in particular the udder, lie within the measuring range of the sensor 22. There is an aperture 33 provided for each attachment member 20, through which the attachment member 20 may extend when it moves in an upward direction. The apertures 32, 33 may be provided with a cover, e.g. a slidable lid or the like. The apertures 33 may also be provided with a flexible flap, which is pushed aside by the attachment member 20, and attached teat cup 21 when extending upward and passing through the aperture 33.

As is apparent from FIGS. 3 and 4, the axes 44 and 45 of the pivots 15 and 18, respectively, go through the central portion of the aperture 33, through which the relevant attachment member may extend. As a result of this construction, the attachment member is always situated approximately in the middle of the aperture when pivoting about the pivots 15 and 18, so that the apertures 33 may be comparatively small.

Between the attachment members 20 shown in FIGS. 3 and 4 there is situated the milking claw 34 which is connected by line 35 to the teat cup 21. Line 35 is, for example, the milk tube or a combination of the milk tube and the pulsation tube. To guide the line 35 during the axial movement of the attachment member 20, a connection cord 36 is arranged between the lower end of the attachment member 20 and said line 35. As a result thereof, the line 35 is partly pulled along upon downward movement of attachment member 20.

The drawings, in particular FIGS. 3 and 4, do not show the external connections required to power or operate the drive members 16, 19 and 28 as well as other external connections, such as the one to the sensor and that for the discharge of the milk.

FIG. 5 shows a first embodiment of the attachment member 20 with the teat cup 21 connected thereto. The attachment member 20 consists of a metal tube connected at its lower end to lever 29. At the lower end a pneumatic cylinder 37 is also attached. At the top end of the pneumatic cylinder 37 there is arranged a flexible connection member 38, e.g. a cord. The opposite, or top, end of the flexible connection member 38 is connected to the lowermost portion 39 of the teat cup 21. It will be obvious that thus the teat cup is pulled against the top of the attachment member 20 when the connection member 38 is under tension. The tension in the connection member 38 can be removed by lengthening of pneumatic cylinder 37, with the result the teat cup may be located at some distance from the attachment member. About the connection member 18 there is arranged a bead-shaped element 40, the shape of which corresponds on the one hand to a recess in the lowermost portion 39 of the teat cup and on the other to a recess in the top side 46 of the attachment member. The presence of the bead-shaped element 40 facilitates the proper positioning of teat cup 21 when the connection member 38 is pulled by pneumatic cylinder 37. Also shown in FIG. 5 are the pulsation tube 41 and the milk tube 42.

FIG. 6 shows a second embodiment of the attachment member, in which the milk tube and/or the pulsation tube is/are conducted through the tubular attachment member 20. This combined line 47 also constitutes the flexible connection member between the teat cup 21 and the attachment member 20, about which there is also provided the bead-shaped element 40. The line 47 is connected to the top end of the pneumatical cylinder 37 by means of clamp 43.

The implement for milking animals operates as follows. After the animal, e.g. a cow, has entered the milking parlor and is located in the desired position, the frame 13 can be moved forward or backward in order to lie approximately in the middle below the animal's udder. In this regard, it is possible to use a so-called cow recognition system, by which, for example through use of a transmitter on the animal's collar it is possible to identify the type animal is present in the milking parlor. As a result of that identification, the movement and positioning of the frame in the longitudinal direction can be effected. It is equally possible, as a result of this information, to deposit a desired amount of fodder in the manger 4, all of which can be done automatically whether or not controlled by a central computer system. When the frame 13 is in the proper position below the udder, the sensor 22 can scan the udder in order to establish the positions of the teats. The end of a teat can be recognized by the comparatively shorter distance to the sensor than that from parts of the udder surrounding said teat end to the sensor. As soon as the sensor has established the spacial position of a teat, an attachment member 20 can be brought to the proper position by means of drive members 16 and 19, whereafter the attachment member having at its end the teat cup 21 is pushed upwardly over a specific distance by energizing drive member 28. The teat cup 21, pulled against the end of the attachment member by means of connection member 38, is then moved through aperture 33 to the relevant teat, whereafter the teat cup by means of the vacuum generated therein is attached to said teat. Subsequently, pneumatic cylinder 37 is energized such that the connection member 38 is relaxed and the teat cup 21 may be located at some distance from the attachment member, whereafter the attachment member is moved slightly downward. As a result, the teat cup has relative freedom of movement, which is required when the animal moves slightly or when the shape of the udder changes due to the decrease in the quantity of milk present.

All the teat cups can be attached consecutively as described, the various actions overlapping each other in time. For example, the sensor can already search for the next teat during the movement of the teat cup 21 towards the earlier found teat.

After the milking operation, the teat cup can be withdrawn from the teat by pulling the connection member 38, whereby the teat cup is pulled again into position against the attachment member 20. Subsequently, the teat cup 21 can be brought again to a position below the milking parlor floor. In order to avoid contamination of the teat cup, it is possible, e.g. when the teat cup is situated below the milking parlor floor, to completely or partly relax the connection member 38, so that the open portion of the teat cup can be directed downward.

Having disclosed our invention, what we claim as new and to be secured by Letters Patent of the United States is:

1. An implementation for milking an animal, such as a cow, comprising a support frame, a scanning means for determining the position of one or more teats of the animal's udder, carrying means for carrying one or more teat cups nearby the teats to which said one or more teat cups should be attached, said carrying means further comprising an attachment member for each said teat cup, each said teat cup being connected to an associated said attachment member by a flexible connection member permitting each said teat cup, after attachment to said teat, to be separated from said associated attachment member.

2. An implement as claimed in claim 1, wherein said connection member is connected at one end near a lower end of said teat cup and at its other end extends through an aperture in said associated attachment member.

3. An implement as claimed in claim 2, wherein said other end of said connection member is attached to a drive means for applying tension to said connection member, so that said teat cup, which may be spaced apart from said associated attachment member, may be pulled towards and seated upon said associated attachment member.

4. An implement as claimed in claim 3, wherein said drive means comprises a pneumatic cylinder.

5. An implement as claimed in claim 4, wherein said pneumatic cylinder is connectible to a vacuum source employed for suction of said animal's milk.

6. An implement as claimed in claim 3, wherein each said attachment member is provided with a tubular member, said teat cup is connected by means of said flexible connection member near an upper end of said tubular member.

7. An implement as claimed in claim 6, wherein said connection member is arranged through at least part of said tubular member.

8. An implement as claimed in claim 7 wherein said connection member is formed by a flexible cord, e.g. of metal wire and/or synthetic material.

9. An implement as claimed in claim 7 wherein said connection member is formed by a milk tube and/or a pulsation tube.

10. An implement as claimed in claim 6, wherein said drive means for applying tension to said connection member is contained at least partly in said tubular member.

11. An implement as claimed in claim 6 wherein contiguous parts of said teat cup and said attachment member are formed to complement each other in such a manner that said teat cup is brought to a specific position when tension is applied by said drive means to said connection member.

12. An implement as claimed in claim 3, wherein said drive means are contained within said attachment member.

13. An implement as claimed in claim 3, wherein said teat cup is placed in a reversed position having its opening directed downward by relaxing the tension on said connection member.

14. An implement as claimed in claim 1, wherein said support frame has mounted guide wheels so that said carrying means may be moved along said animal's longitudinal axis and positioned approximately below said animal's udder.

15. An implement for milking an animal, such as a cow, comprising a support frame, a scanning means for determining the position of one or more teats of the animal's udder, carrying means for carrying one or more teat cups nearby the teats to which one or more of said teat cups should be attached, said carrying means further comprising an attachment member for each said teat cup, said attachment member being provided with a tubular member, each said teat cup being connected to an associated said attachment member near an upper end of said tubular member by a flexible connection member thereby permitting each said teat cup, after attachment to a teat, to be separated from said associated attachment member, said flexible connection member being connected at one end to a lower end of said teat cup and said flexible connection member's other end extending through an aperture in said associated attachment member, said other end of said connection member being attached to a drive means for applying tension to said connection member, contiguous parts of said teat cup and said associated attachment member being formed to complement each other in such a manner that said teat cup, when tension is applied by said drive means to said connection member, is brought substantially into alignment with and at said upper end of said tubular member of said associated attachment member.

16. An implement for milking an animal, such as a cow, comprising a support frame, a scanning means for determining the position of one or more teats of the animal's udder, carrying means for carrying one or more teat cups nearby the teats to which one or more of said teat cups should be attached, said carrying means further comprising an attachment member for each said teat cup, said attachment member being provided with a tubular member, each said teat cup being connected to an associated said attachment member near an upper end of said tubular member by a flexible connection member thereby permitting each said teat cup, after attachment to a teat, to be separated from said associated attachment member, said flexible connection member being connected at one end to a lower end of said teat cup and said flexible connection member's other end extending through an aperture in said associated attachment member, said other end of said connection member being attached to a drive means for applying tension to said connection member, contiguous parts of said teat cup and said associated attachment member being formed to complement each other in such a manner that said teat cup is brought to a specific position when tension is applied by said drive means to said connection member, wherein there is arranged about said connection member, between said teat cup and said associated attachment member, a bead-shaped element which, when tension is applied by said drive means to said connection member, becomes seated in a recess of complementary shape between said teat cup and said associated attachment member.

17. An implement as claimed in claim 16, wherein said bead-shaped element is substantially globular.

18. An implement for milking an animal, such as a cow, comprising a support frame, a scanning means for determining the position of one or more teats of the animal's udder, carrying means for carrying one or more teat cups nearby the teats to which one or more of said teat cups should be attached, said carrying means further comprising an attachment member for each said teat cup, each said teat cup being connected to an associated said attachment member by a flexible connection member thereby permitting each said teat cup, after attachment to a teat, to be separated from said associated attachment member, said flexible connection member being connected at one end to a lower end of said teat cup and said flexible connection member's other end extending through an aperture in said associated attachment member, said other end of said connection member being attached to a drive means for applying tension to said connection member so that said teat cup may be pulled towards and seated upon said associated attachment member, wherein said associated attachment member is provided with an elongated, axially slidable portion which from a position below a milking parlor floor is moved substantially axially towards a position wherein said slidable portion extends through an opening in the floor to above said floor and near said animal's udder, said teat cup being connected to an end of said slidable portion by means of said connection member.

19. An implement as claimed in claim 18, wherein said slidable portion is of a tubular configuration.

20. An implement as claimed in claim 19, wherein said attachment member is supported such that it is capable of pivotal movement about at least two axes, said axes set at an angle from the horizontal plane such that said axes substantially intersect in the central portion of said aperture in said milking parlor floor.

21. An implement as claimed in claim 20, wherein said support of said attachment member comprises a first and a second frame portion, said first frame portion being pivotal about a first pivot axis and said second frame portion, to which said attachment member is mounted, being connected to said first frame portion pivotally about a second pivot axis.

22. An implement as claimed in claim 21, further comprising a means for bringing said attachment member to a predetermined position by pivoting about said axes.

23. An implement as claimed in claim 22, wherein said means include stepper motors.

24. An implement as claimed in claim 18 wherein said slidable portion is slidable axially through a guide portion, and that said slidable portion is seized near a lower end by a drive member effecting axial movement.

25. An implement as claimed in claim 24, wherein said drive member is provided with a screw spindle unit, said spindle unit controlled by means of an electrical signal.

26. An implement as claimed in claim 25, wherein displacement of said slidable portion is achieved by means of lever action of a rod system which is greater than a change in length of said screw spindle unit.

27. An implement as claimed in claim 18, wherein said teat cup is attached to the teat of the animal's udder by pivoting said attachment member to a predetermined position and sliding said axially slidable portion over a predetermined distance, so that said teat cup, arranged near an upper end of said slidable portion, slides over the teat of the animal's udder.

28. An implement for milking an animal, such as a cow, comprising a support frame, a scanning means for determining the position of one or more teats of the animal's udder, carrying means for carrying one or more teat cups nearby the teats to which one or more of said teat cups should be attached, said carrying means further comprising an attachment member for each said teat cup, each said teat cup being connected to an associated said attachment member by a flexible connection member thereby permitting each said teat cup, after attachment to a teat, to be separated from said associated member, said flexible connection member being connected at one end to a lower end of said teat cup and said flexible connection member's other end extending through an aperture in said associated attachment member, said other end of said connection member being attached to a drive means for applying tension to said connection member so that said teat cup may be pulled towards and seated upon said associated attachment member, wherein there are provided one or more openings, through each of which openings may extend one of said attachment members, said one or more openings being arranged in a raised portion relative to a milking parlor floor, whereby said animal stands with its hindlegs on both sides of said raised portion.

29. An implement for milking an animal, such as a cow, comprising a support frame, a scanning means for determining the position of one or more teats of the animal's udder, carrying means for carrying one or more teat cups nearby the teats to which one or more of said teat cups should be attached, said carrying means further comprising an attachment member for each said teat cup, said attachment member being provided with a tubular member, each said teat cup being connected to an associated said attachment member by a flexible connection member thereby permitting each said teat cup, after attachment to a teat, to be separated from said associated attachment member, said flexible connection member being connected at one end to a lower end of said teat cup and said flexible connection member's other end extending through an aperture in said associated attachment member, said other end of said connection member being attached to a drive means for applying tension to said connection member so that said teat cup may be pulled towards and seated upon said associated attachment member wherein said connection member is formed by a milk tube and/or a pulsation tube, said milk tube and said pulsation tube being at least partly coaxial.

* * * * *